April 30, 1935.  J. S. PECKER  1,999,737
AIRCRAFT HAVING SUSTAINING ROTORS
Filed June 19, 1931   3 Sheets-Sheet 1

INVENTOR
Joseph S. Pecker
BY
Synnestvedt & Lechner
ATTORNEYS

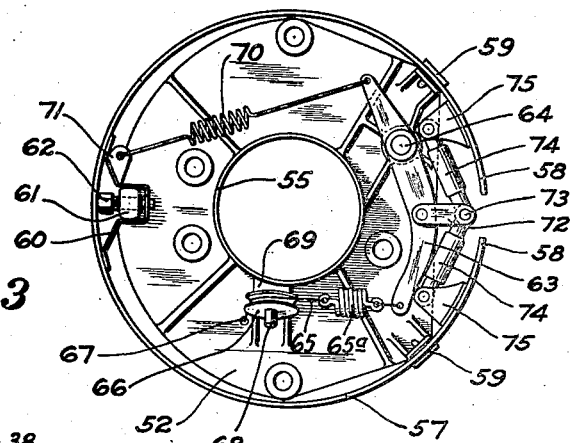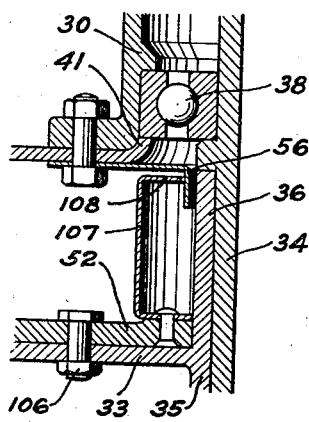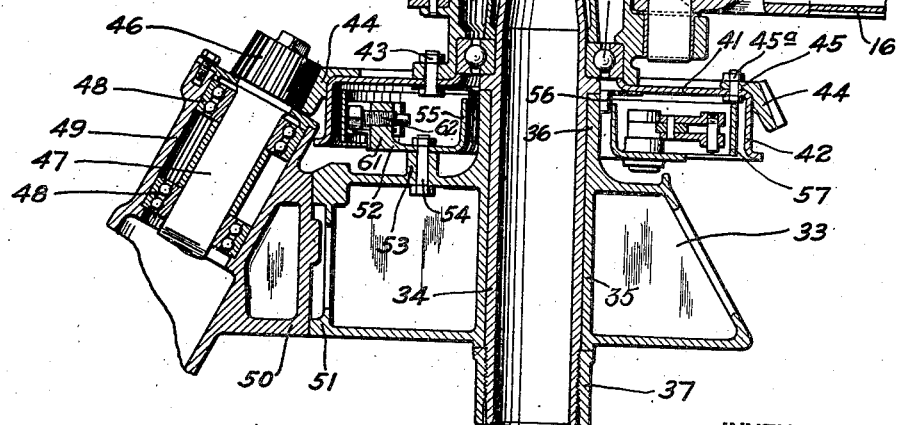

April 30, 1935.  J. S. PECKER  1,999,737
AIRCRAFT HAVING SUSTAINING ROTORS
Filed June 19, 1931  3 Sheets-Sheet 3
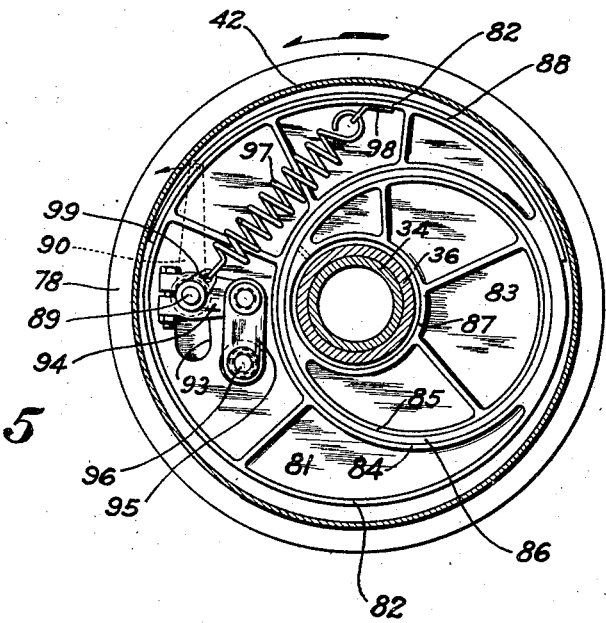
Fig:5
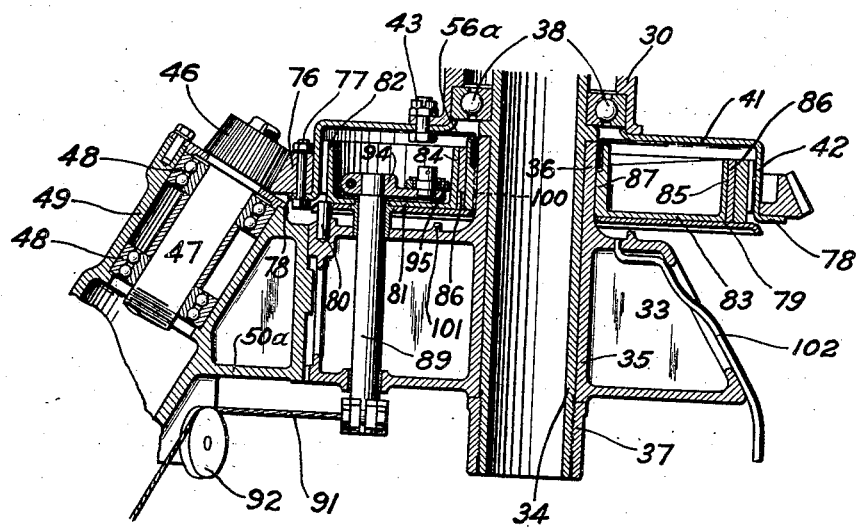
Fig:4
INVENTOR
Joseph S. Pecker
BY
Synnestvedt & Lechner
ATTORNEYS Patented Apr. 30, 1935

1,999,737

UNITED STATES PATENT OFFICE 1,999,737

AIRCRAFT HAVING SUSTAINING ROTORS

Joseph S. Pecker, Philadelphia, Pa., assignor to Autogiro Company of America, Philadelphia, Pa., a corporation of Delaware Application June 19, 1931, Serial No. 545,451

20 Claims. (Cl. 244—19)

This invention relates to aircraft having sustaining rotors and is especially concerned with the rotor construction itself as well as a number of parts associated therewith.

Still more specifically, this invention deals with the mounting of an aircraft sustaining rotor at the top of a supporting pylon structure in association with various other structures such, for example, as a rotor brake and a mechanical rotor starter.

Among the more important objects of the invention might be mentioned generally improved efficiency from the standpoint of construction, assembly, and maintenance. In addition, the invention has in view improving the efficiency of such structures from an aerodynamic standpoint.

With this in mind the present invention makes provision for the mounting of a rotor axis mechanism at the top of a supporting pylon or mounting structure, in such manner that the various parts neatly cooperate with each other to occupy a minimum of space as well as to afford maximum accessibility of any parts which might, from time to time, require lubrication, replacement, or repair.

As a further object this invention contemplates a novel arrangement of rotor brake disposed preferably, in large part, below the main rotor bearings and closely overlying the apex or upper portion of the pylon or mounting structure. The invention further provides, in a structure of this type, for the discharge of any lubricant leakage or overflow, from the main rotor bearings, at a point remote from the effective braking surfaces of the brake parts.

As another object, this invention provides for the mounting of certain brake parts within a brake drum which opens downwardly and which is carried by the movable portion of the rotor axis mechanism. This arrangement is of substantial importance in facilitating inspection or relining of the brake as removal of the rotor displaces the drum to expose the brake parts housed therein.

Additionally, the present invention provides, in a structure of the character above referred to, rotor starter parts mounted or carried on the brake drum. This considerably simplifies the matter of transmission of torque from the rotor starter proper to the hub of the rotor and, at the same time, is advantageous from the standpoint of construction, it being noted that the total number of parts as well as weight is kept at a minimum.

As a further object, this invention makes provision for the extension of brake operating means from the rotor head, at which point the brake is mounted, to a cockpit in the body of the craft, the extension preferably being adjacent one of a plurality of pylon posts or legs of the rotor mounting structure.

Still further, this invention has in view the provision of a brake mechanism, for a sustaining bladed rotor, which is readily adaptable to rotor axis mechanisms of various different types. Furthermore, the invention has in view utilizing a downwardly open brake drum which is constructed and arranged with respect to various other parts of the rotor head, in such manner that a wide variety of internal expansion brake parts may readily cooperate therewith. A change in the form or type of certain of the brake parts, therefore, does not necessitate or require replacement of the drum, axis parts, bearings, or other mechanism.

The foregoing objects and advantages, as well as others which will occur to those skilled in the art, will be more apparent from a consideration of the following description making reference to the accompanying drawings, in which Figure 1 is a somewhat diagrammatic side view of an aircraft having sustaining blades or a sustaining rotor, this view illustrating one embodiment of various features above referred to;

Figure 2 is a vertical sectional view of a rotor hub or axis structure, this view showing a somewhat modified axis but also illustrating an application of various features referred to above;

Figure 3 is a top plan view of certain rotor brake parts which are embodied in the hub structure illustrated in Figure 2;

Figure 4 is a view similar to Figure 2 but illustrating a modified rotor brake arrangement as well as certain other features referred to more fully hereinafter. Figure 4, however, does not include the upper portion of the rotor hub, this being omitted for the sake of clarity in the drawings;

Figure 5 is a view similar to Figure 3 but illustrating, in top plan, various brake parts which are incorporated in the structure of Figure 4; and Figure 6 is a fragmentary vertical sectional view of a modification of certain parts illustrated in Figures 2 and 3.

Figure 1:
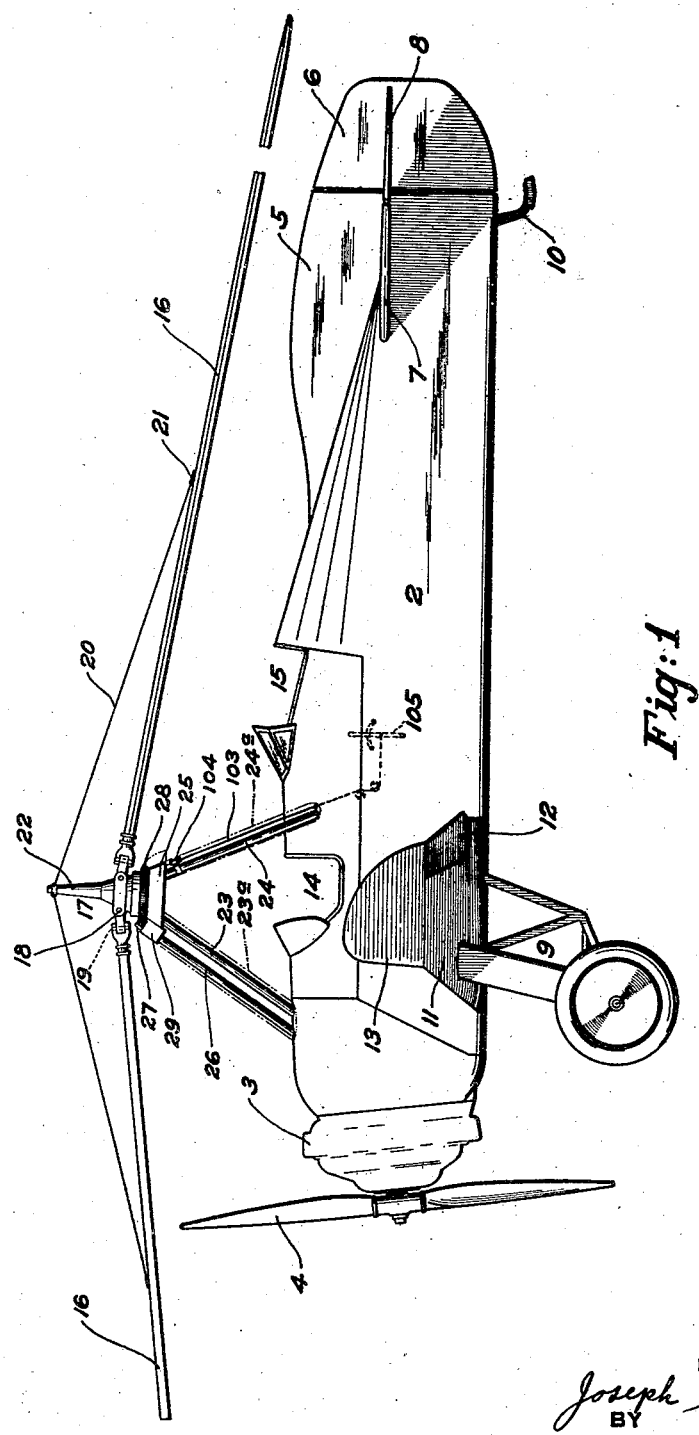

Making reference first to Figure 1, it will be seen that I have therein illustrated an aircraft of the type here involved having a body or fuselage 2, engine and propeller 3—4, fixed and controllable vertical tail surfaces 5—6 and similar horizontal surfaces 7—8. The craft may also be provided with suitable landing gear indicated generally at 9 as well as a tail skid 10. Small fixed wings 11 carrying aileron surfaces 12 and having upturned tips 13 may also be provided at opposite sides of the fuselage. The occupant or passenger arrangements may be of any desired type, in this instance two cockpits 14 and 15 being provided for this purpose.

The sustaining rotor itself may be composed of any convenient or desired number of blades 16, two of which are illustrated in Figure 1. In this connection, however, it should be noted that I prefer to employ more than two sustaining blades but have omitted additional blades from the showing of Figure 1 for the sake of clarity in the drawings. In order that the blades may be free, independently, to assume various positions under the influence of inertia, lift, drag, antidrag, and other forces to which they are subjected in flight operation, each blade is pivotally attached or mounted on a hub or axis structure indicated in general in Figure 1 by the reference numeral 17. The individual blade pivots, furthermore, preferably include substantially horizontally disposed pivot pins 18 and substantially vertically disposed pivot pins 19. For the purpose of supporting the rotor blades when they are inactive or at rest or when they are not revolving at a speed sufficient to cause centrifugal force to maintain them in outwardly extended positions, I may also employ "droop" cables 20 which are attached to the blades as at 21 and also to an upward extension 22 of the rotor head.

The mounting or pylon structure for the rotor may advantageously be composed of a plurality of posts 23 and 24. In Figure 1 the structure includes one leg 23 extended upwardly substantially centrally of the fuselage 2 and two rear legs 24 which extend upwardly and forwardly from points adjacent the sides of the fuselage to meet the forward leg and be interconnected therewith in an apex structure 25. This particular form of mounting means, however, is not a part of the present invention per se, but is described and claimed in the copending application, Serial No. 497,745, filed November 24th, 1930, of Juan de la Cierva, assignor to the assignee of this application, said application having issued as Patent No. 1,911,183.

Before turning to the more detailed figures, attention is called to the showing, in Figure 1, of a starter drive shaft 26 extended upwardly and rearwardly adjacent the front pylon leg 23 and carrying at its upper end a pinion or gear 27 adapted to mesh with a cooperating gear 28 which is associated with the rotatable portion of the rotor axis. The upper end of the shaft 26 may be supported and journaled within a casing or housing 29 which is mounted on the pylon apex 25. The starter may derive its power or torque from the engine 3 and is normally used to initiate rotation of the blade system prior to takeoff. Various features of the starter construction shown in Figure 1, as well as in the remaining figures, are not a part of the present invention per se, but are described and claimed in my copending application, Serial No. 512,383, filed January 30th, 1931. They have here, however, a novel cooperation with some of the brake parts.

In considering the showing of Figures 2 and 3, reference is first made to the somewhat modified arrangement of individual blade pivots here illustrated. In this instance each blade 16 (only one of which is included in Figure 2) is articulated or pivotally joined to the rotating hub part 30 by means of a vertical pivot pin 31 and a horizontal pin 32. The arrangement of pins here illustrated involves disposition of the vertical pin 31 inside of the horizontal pin 32 in the manner described and claimed in my copending application Serial No. 561,344, filed September 5, 1931, which issued August 21, 1934 as Patent No. 1,971,016.

The pylon apex structure is indicated in Figure 2 at 33 and in considering the arrangements of this figure it should be borne in mind that this apex structure 33 is adapted to interconnect the upper ends of a plurality of pylon posts such as indicated at 23 and 24 in Figure 1. At this point, however, it is observed that while certain features of the present invention are particularly applicable to a pylon supporting structure embodying a plurality of post elements, at the same time, numerous advantages herein contemplated may also be obtained where other mounting pylons are employed.

The pylon apex 33, in addition to being arranged to receive or interconnect a plurality of supporting post elements, is also configured to receive and engage a central rotor axis member 34. In the preferred arrangement the structure 33 is provided with a central substantially cylindrical socket 35 of internal dimension suitable to fit the spindle member 34. This socket may also, desirably, be extended upwardly from the structure 33 as shown at 36 in Figure 2, to provide a neat assembly arrangement in which a bearing shoulder projects above the brake parts, and to strengthen the structure in the region of brake and starter reaction.

At its lower end the spindle 34 is threaded to receive the nut or collar 37 which may conveniently serve as an abutment through which the lift or sustension of the rotor is transmitted to the apex structure 33 and, from thence, through the pylon posts to the body of the craft. Such a securing device for the spindle 34 is highly advantageous in providing for the unitary removal of the rotor including the blades thereof and their individual articulations, all as more clearly brought out and claimed in the copending application of Agnew E. Larsen, Serial No. 529,576, filed April 13th, 1931, said application having issued as Patent No. 1,982,113. It is here noted that this feature (provision of unitary rotor removal by means of a single securing nut) is not a part of the present invention per se, but has special advantages in combination with the structure I have devised.

Proceeding now upwardly to the central portion of the rotor hub, it will be noted that the spindle 34 is extended substantially above the socket 35—36 as well as above the apex structure. This spindle serves as a fixed mount or axis member for the rotor hub 30, suitable bearings 38 being interposed between these two relatively rotatable axis parts 30 and 34. It will also be seen that the structure disclosed in Figure 2 includes an upwardly extended portion or mast 39 carrying apertured lugs 40 to which the blade droop cables 20, illustrated in Figure 1, may be attached.

Before proceeding with a discussion of the brake mechanism itself, it should here be noted that the various bearings 38 are preferably arranged to transmit thrust in both directions as well as to provide for free running of the rotor around the central spindle 34. These bearings, may advantageously be lubricated by utilizing the substantially cylindrical space, between the axis members 30 and 34, as a reservoir in which oil or grease may be packed or retained.

The brake mechanism of the head structure of Figure 2 includes a downwardly open brake drum 41 having a cylindrical wall 42 against which, preferably at the inside, cooperating brake parts are arranged to react. The drum 41 is secured to a lower portion of the hub member 30 as by means of securing bolts 43. As here shown the brake drum 41 additionally serves to carry or support a ring gear 44 which may be secured thereto in any desired manner as, for example, by bolting 45a. This gear element, it will be noted, has an inwardly projecting bolting flange 45 overlying the top of the drum 41 and thus serving to reenforce or strengthen the drum itself as well as to provide a more sturdy gear construction, it being noted that the gear is arranged substantially peripherally of the disk portion of the drum to transmit the driving torque to the rotor hub more or less directly inwardly through this disk portion. The starter mechanism is only fragmentarily shown in Figure 2, the parts here illustrated including a pinion 46, meshing with gear 44, and a shaft 47 journaled, by means of bearings 48, in a housing 49. The bearing and supporting housing 49 preferably has an extended bracket portion 50 at one side thereof to facilitate attachment to the apex structure 33 adjacent the forward portion 51 thereof.

The internal brake parts, in the arrangement of Figures 2 and 3, include a substantially circular plate member 52 which is mounted at the upper side of the apex structure 33 as by means of lugs 53 and bolts 54. This plate 52, therefore, serves as a fixed support for the inner brake parts, it being borne in mind that the drum 42 is mounted to rotate with the rotor. In this connection, it should also be noted that the fixed mounting of the plate 52 may be accomplished by means of a circular or cylindrical flange positioned concentrically of the axis members at a radius equal, for example, to the distance of the lug 53 from the center of the axis. Various advantages of such an arrangement will be pointed out more fully hereinbelow in considering Figure 4.

The plate 52 is, of course, centrally apertured to pass the axis parts 34 and 36 and, in the preferred arrangement, is provided with an upstanding flange or collar 55 (see Fig. 2) which cooperates with a downturned or flanged collar 56 to positively prevent discharge of lubricant leakage or overflow, from the main rotor bearings, onto the effective braking surfaces. In other words, the members 55 and 56 cooperate, as baffles, to divert any leakage or overflow of lubricant which may occur downwardly through the central opening in the plate 52. From this point the lubricant may be permitted to drain away although I prefer to adopt a more positive means of disposing of such excess or overflow lubricant as brought out fully hereinafter in connection with Figure 4.

Turning now particularly to Figure 3, it will be seen that the internal brake parts include an expansion band 57 of substantially cylindrical form having its ends 58—58 spaced somewhat from each other to provide for proper brake action. Substantially radial brackets 59—59 are mounted on the plate 52 adjacent the two ends 58—58 of the brake band to properly position the band vertically. Diametrically opposite to the band ends 58—58 I preferably attach a bent bracket or strip 60 internally of the band in position to engage a lug 61 which projects upwardly from the base plate 52 of the brake. This bracket and lug arrangement also provides for vertical support of the band 57 on the base plate 52 and, in addition, permits outward and inward movement of the band during brake operation. A bolt 62 may suitably be threaded into the upstanding lug 60 and serve as an adjustment or abutment against which, upon contraction, the brake band contacts.

The brake operating mechanism here shown includes an operating lever 63 preferably fulcrumed as at 64 intermediate its ends. An operating cord or cable 65 may be extended from one end of the lever 63 over a pulley or grooved wheel 66 and downwardly through an aperture 67 in the plate 52. The pulley, of course, may suitably be mounted to rotate on a pin 68 supported by bracket 69.

A spring 65a is inserted in the operating cord 65 in order to limit the force with which the brake may be applied. This spring 65a is preferably disposed, as shown in Figure 3, more or less internally of the brake so that it constitutes a part of the brake unit and also to prevent disarrangement thereof by any unskilled person who might be adjusting the brake operating means in the cockpit.

The strength of the spring is such as to provide for transmission of sufficient operating pull to effect all normal brake action without appreciable extension of the spring. In other words, its yield point is above the normal braking pressure range. The use of a spring or resilient device of this type, arranged in the manner specified, is advantageous in preventing distortion or rupture of the brake parts themselves and also to prevent the transmission to the brake of such a braking effort as would damage the rotor, the pylon or the hub structure including the resilient devices normally used to cushion individual blade movements. The spring arrangement here adopted, furthermore, is such that wear or adjustment of the brake does not affect the action of the spring in limiting the pull transmissable therethrough to the brake.

At its other end the lever 63 is provided with a releasing spring indicated at 70 which is extended from the lever 63 to an apertured lug 71 secured to the bracket 60. A link 72, pivoted to the lever 63 intermediate the fulcrum 64 and the end to which the operating cord is attached, is extended outwardly from the main operating lever and pivotally joined as at 73 to a pair of links 74—74. The links of this last pair are, in turn, pivoted to the apertured brackets or lugs 75 which are mounted on the brake band itself at points adjacent to the ends 58—58 thereof.

In the preferred arrangement the links 74 are adjustable in length so that the brake action may be altered to compensate for wear and the like. The manner of operation of this brake is substantially as follows:

When it is desired to make a brake application the operating or control cord 65 is pulled in such manner as to cause the lever 63 to rock on its pivot 64 against the pressure of spring 70. This movement causes inward movement of link 72 with the result that the outer ends of the interconnected pairs of links 74—74 are spread. This effects a similar expansion or spreading of the band itself to contact with the internal surface of the drum flange 42.

Turning now to the showing of Figures 4 and 5, attention is first called to the fact that various portions of the pylon apex, rotor axis, and starter parts, as well as the brake drum, shown in this view, are substantially the same as corresponding parts described above. Similar reference numerals have, therefore, been applied to the corresponding parts which take substantially the same form as between Figures 2 and 3 and Figures 4 and 5. In this instance, however, the starter shaft supporting means 50a is somewhat modified in form in order to bring the pinion or gear 46 slightly lower than the position which this part occupies in Figure 2. This modification is made in order that the starter pinion 46 may cooperate with the ring gear 76 which is mounted somewhat differently than the gear 44 of Figure 2. In this case, the gear 76 is disposed externally of the cylindrical flange 42 of the drum 41 and is secured to the drum as by means of bolts 77 extended through the gear itself as well as through the outturned flange 78 at the lower edge of the drum part 42. This makes it possible either to reduce the overall height of the hub, or to provide for a greater degree of pivotal movement of the rotor blades, as desired.

The drum 41 is secured to the movable hub member 30 and positioned in the same manner as described above in connection with Figure 2. Here, however, I have illustrated the application of a different type of internal expanding brake. These modified brake parts are supported above the pylon apex structure 33 on a base plate 79, pins 80 being provided for this purpose. The brake itself includes a member 81 having a peripheral upstanding flange 82 and a circular or cylindrical opening therein which is eccentric or offset with respect to the axis receiving and supporting socket 36. An additional brake part 83 is fitted within the opening in the plate 81, both of these parts 81 and 83 being provided with cooperating upstanding flanges 84 and 85 between which an anti-friction collar 86 may be mounted to float freely upon actuation of the brake. The part 83, of course, is also provided with an eccentrically arranged aperture having an upstanding flange 87 adapted to engage the external surface of the upper portion 36 of the axis receiving socket 35. At one side of the larger or outer brake eccentric 81, I have arranged a band of braking material 88 and upon actuation of the brake parts, in the manner described hereinafter, this band is moved outwardly from the center of the axis structure to contact with the inner surface of the brake drum flange 42.

The operating mechanism for this brake includes (see Fig. 4) a shaft 89 which is rotatably mounted in the pylon apex structure 33 and which projects therebelow as well as above this apex structure through the supporting plate 79 and the eccentric member 81. At its lower end (see Fig. 5) the shaft 89 is provided with a laterally extended arm 90 to which (see Fig. 4) the operating or control cable 91 is attached. The cable 91 is extended from this arm substantially horizontally to pass over a convenient pulley 92 mounted in association with the starter shaft supporting parts. From this point the cable may still further be extended to a cockpit of the craft to be joined with a manually operable lever in a manner similar to that described herebelow in connection with Figure 1.

At its upper end the shaft 89 is extended through an elongated slot 93 formed in the eccentric brake part 81 and at a point above this brake part the shaft 89 is provided with a crank 94 extended generally radially inwardly to be pivotally connected with a link 95. This latter link is also pivoted as at 96 to the brake plate 81.

From the foregoing it will be apparent that a pull on the cord 91 will result in movement of the lever 90 in the direction indicated by the arrow in Figure 5. This rotates the shaft 89 and thus turns the crank 94 to draw or move the brake part 81 eccentrically around the inner brake part 83, it being borne in mind, of course, that the latter or inner member is fixed as against rotation with respect to the central axis parts 34 and 36. Such eccentric movement causes the band 88 to be forced against the inner surface of the drum flange 42.

Release of the brake may be accomplished automatically with the various parts arranged as illustrated in Figures 4 and 5, it being noted in this connection that the drum 41 is rotating with the rotor hub in the direction indicated by the arrow at the top of Figure 5. Assuming that the band 88 is in contact with the drum flange 42, upon release of the brake, the movement of the drum will cause similar but eccentric movement of the brake part 81. This will effect a return of the brake parts substantially to the position illustrated in Figure 5 in which the brake band 88 is not contacting with the drum flange 42. However, I prefer, more or less as a safety device, to apply a releasing spring 97 secured at its ends to a bracket 98 attached to the outer upstanding flange 82 of the brake element 81 and an apertured clip 99 which is mounted on the operating spindle or shaft 89. The action of this return or releasing spring will be apparent when it is borne in mind that the spindle 89 is fixed, while the elongated slot 93 in the plate 81 permits movement of this plate with respect to the spindle 89.

In Figure 4 I have also illustrated the application of lubricant baffle means 56a having a downturned flange positioned within a recess or cylindrical cavity formed within the flange 87 of brake part 83. This flange 87 is also channelled as indicated at 100 to provide for the passage of lubricant downwardly just outside of the axis socket part 36. Furthermore, at the top of the apex structure 33 I have provided a circular upstanding flange 101 which serves as a reservoir to collect any lubricant which may be discharged downwardly. From this point, the excess lubricant may be conducted away through tubing 102. In the preferred arrangement, I arrange this tubing to extend from the reservoir formed by the flange 101 outwardly to a point adjacent one of the supporting pylon posts so that the tube may still further be extended downwardly along such post to discharge laterally of or below the body of the craft.

In Figure 6 I have illustrated a somewhat modified structure which may be adopted to keep the bearing lubricant away from the effective braking surfaces. This figure includes a fragmentary showing of the rotor spindle or axis member 34 socketed within the parts 35 and 36 of the mounting structure 33. As in Figures 2 and 3, a bearing 38 is here shown as being interposed between the hub member 30 and the central fixed spindle 34. The base or backing plate 52 for the brake is fragmentarily illustrated in Figure 6 as being secured to the pylon apex structure 33 as by means of bolts 106.

According to this arrangement, a baffle plate 75

107 is bolted or riveted to the backing plate 52 from which it extends upwardly around the central axis parts 34 and 36 to terminate in an inturned flange 108. The rotating parts, i. e., the hub member 30 and the brake drum 41, also carry a downturned baffle member 56 similar to that described above in connection with Figures 2 and 3. In the construction of Figure 6, however, the inner edge of the flange 108 of the fixed baffle 107 is projected closely adjacent to the outer surface of the flange on baffle member 56 and, in addition, the fixed member 107 is spaced substantially from the central axis parts in order to provide a reservoir, of considerable capacity, in which any lubricant leakage or overflow from the main bearings may accumulate. An arrangement of this character may be especially desirable where the type of lubrication adopted is such that only a relatively small quantity of excess or overflow will occur. This reservoir may be made of such capacity that it need not be emptied except at such times as the rotor would normally be removed for purposes of inspection.

In considering the various arrangements above described, it should be noted that in all of them provision has been made for the extension of the brake operating cord or cable downwardly to the body of the craft (preferably to the pilot's cockpit) along one of the supporting pylon posts or legs.

Thus in Figure 1 I have illustrated the extension of a brake operating cable 103 over a pulley 104 and downwardly adjacent to a rear pylon leg 24 to pass, through a suitable aperture arranged in the fuselage covering, into the pilot's cockpit 15. At this point a lever 105 or any other suitable manually operable control member may be connected to the cable for the purpose of brake actuation.

In the arrangement of Figures 2 and 3 the brake operating cable 65 may be conducted downwardly into the pilot's cockpit similarly to the manner described in connection with Figure 1 or, if desired, this cable may be extended downwardly adjacent a forward pylon leg. In this case, the cable is passed over any desired pulley arrangements to a proper point for the disposition of a manually operable control member.

The arrangement of Figures 4 and 5 also provides for the extension of a brake operating cable 91 forwardly and down to the fuselage adjacent a front pylon post. In this instance it will be observed that the arrangements are such as to provide for the extension of the operating cable closely adjacent to the starter shaft.

In all arrangements, the brake operating cord may be enclosed within a pylon post streamlining such, for example, as that diagrammatically illustrated in Figure 1 at 24a. It will also be apparent that with the three leg pylon arrangement of Figure 1 the starter shaft 26 and the front pylon post 23 may be streamlined as a unit in a housing 23a. In considering this matter of streamlining, attention is also called to the fact that where a lubricant discharge pipe such as illustrated at 102 in Figure 4 is employed, this pipe may also be extended within a pylon post streamline housing. At this point, it is observed, however, that it is advantageous to extend the brake operating cables or any lubricant discharge piping which may be employed adjacent to one or more of the pylon posts even if these elements are not enclosed in streamline housings.

All of the various arrangements described above embody the advantages incident to utilization of the pylon apex structure as a point of reaction not only for the brake but also, at least in part, for the starter. Additionally, the various forms of structure herein disclosed utilize one of the brake members as an element through which the starting torque is transmitted to the rotor hub. The rotor head, in general, is, therefore, maintained at small overall dimensions as well as total weight.

The mounting of the starter ring gear around the brake drum is also of substantial advantage, since the gear serves to materially reenforce the drum to resist any excessive expansive force of the internal brake parts. Additionally, the location of the bearing 38 adjacent, or substantially in the same plane with, the drum, the braking mechanism and the driving mechanism, provides an extremely rigid and efficient structure in which the brake and starter torques are transmitted to the main rotating structure in a direct manner.

The provision of a downwardly open brake drum mounted to move with the rotor hub is further of advantage in providing for the use of internally expanding brake parts of different types, it being noted that in craft of different load or aerodynamic characteristics, it may be desirable to employ such different braking arrangements. This downwardly open drum is also desirable as it facilitates removal of the rotor, as a unit, including the hub member proper which carries with it the drum itself. In this way, the stationarily mounted brake parts are retained in their proper positions at the top of the supporting or pylon structure and need not be disturbed by removal of the rotor. The brake operating parts, therefore, neatly cooperate with the type of readily removable axis or hub mechanism herein shown, to afford maximum convenience in gaining access to the inner brake parts, for example, for the purpose of relining or the like and, at the same time, the internal brake parts, when the structure is assembled, are well protected from moisture, dust or dirt.

The brake mechanism, as clearly brought out above, is arranged in such manner that overflow or excess lubricant, discharged from the main rotor supporting bearings, is kept away from the effective braking surfaces, with the result that proper brake actuation is ensured, and that the lubricant is prevented from being thrown, by rotating parts, over the craft or its occupants.

The present invention, as will be apparent from the above consideration, attains various objects and advantages hereinbefore noted by the use of structure and parts which are of great strength and which are yet simple in manufacture and assembly, particular attention being called to the neat cooperation of braking, rotor axis, pylon apex and starter elements all disposed about the center of the rotor axis itself to reduce the overall dimensions of the head structure and thus enhance the aerodynamic characteristics of the craft as a whole.

What I claim is:—

1. In an aircraft having a sustaining rotor, mounting means for the rotor including a fixed structure and an axis member rotatable with the rotor, a brake mechanism arranged to react between said structure and said member, and a rotor starter arranged to react at least partially between said member and structure, said brake mechanism including a downwardly open drum with cooperating brake parts mounted therein, the rotor including said axis member and the brake drum being removable, as a unit, from the mounting means.

2. In an aircraft having a sustaining rotor, mounting means for the rotor including a fixed structure and an axis member rotatable with the rotor, a brake mechanism arranged to react between said structure and said member, and a rotor driving mechanism arranged to react at least partially between said member and structure, said brake mechanism including a drum rotatable with the axis member, and said driving mechanism including a driving gear supported, at least in part, on said drum peripherally thereof.

3. In an aircraft having a sustaining rotor, brake mechanism for the rotor including a downwardly open drum with cooperating brake parts housed, at least partially, therein, the drum being mounted for rotation with the rotor, and the rotor and the drum being arranged for unitary removal.

4. In an aircraft of the rotative sustaining blade type, an axis mechanism for the blades including relatively movable members with a bearing disposed therebetween, means for braking rotary movement of the blades including brake parts disposed, at least in part, below said bearing, and baffle means arranged to control leakage or overflow of lubricant from said bearing and prevent contact thereof with the effective braking surfaces of said brake parts.

5. In an aircraft of the rotative sustaining blade type, an axis mechanism for the blades including relatively movable members with a bearing disposed therebetween, and means for braking rotary movement of the blades including brake parts disposed, generally, coaxially with said mechanism, at least in part, below said bearing, the axis and brake parts being arranged to provide for the discharge of lubricant leakage or overflow from said bearing downwardly through brake parts at a point remote from the effective braking surfaces thereof.

6. In an aircraft of the rotative sustaining blade type, a blade axis mechanism including relatively rotatable members having a bearing therebetween, mounting means for one of said members, and means for braking rotary blade movement including a downwardly open drum-like structure rotatable with the other of said axis members, together with means associated with the mounting structure for collecting lubricant leakage or discharge from said bearing.

7. In an aircraft of the rotative sustaining blade type, a blade axis mechanism including relatively rotatable members having a bearing therebetween, mounting means for one of said members, and means for braking rotary blade movement including a downwardly open drum-like structure rotatable with the other of said axis members, together with means associated with the mounting structure for collecting lubricant leakage or discharge from said bearing, and conduit-means for conducting the collected lubricant to a point of discharge remote from the brake parts.

8. In an aircraft having a sustaining rotor, substantially fixed mounting means for the rotor, an axis member movable with the rotor, and a brake mechanism for the rotor including cooperating brake parts mounted on said means and on said member, the rotor, said axis member and the brake parts associated therewith being arranged for unitary removal from the mounting means.

9. In an aircraft having a sustaining rotor; a rotor mount including a plurality of supporting post elements and an apex structure; rotor axis parts mounted on said structure; and a rotor brake mounted in association with said structure and including an operating connection extended downwardly therethrough and positioned thereby.

10. In an aircraft having a sustaining rotor; a rotor mount including a plurality of supporting post elements and an apex structure; rotor axis parts mounted on said structure; and a rotor brake mounted in association with said structure and including an operating connection extended downwardly therethrough and positioned thereby, the operating connection being further extended downwardly to the body of the craft adjacent a supporting post element.

11. An aircraft rotor construction including a hub structure having a flange-like member, means for applying a driving force to said member upon the outside thereof, and means for applying a braking force to said member upon the inside thereof.

12. An aircraft rotor construction including a hub structure having a flange-like member, means for applying a driving force to said member upon the outside thereof, and means for applying a braking force to said member upon the inside thereof, said last means including internal expansion braking mechanism.

13. An aircraft rotor construction including a hub structure having a flange-like member, means for applying a driving force to said member upon the outside thereof, and means for applying a braking force to said member upon the inside thereof, said last means including internal expansion braking mechanism, and said first means including a driven gear positioned to resist expansion of the flange-like member.

14. In an aircraft having a sustaining rotor, a rotatable axis member carrying a brake drum, and a rotor starter including a ring gear mounted on the drum and having an internal flange serving to interbrace the gear and the drum.

15. In an aircraft having a sustaining rotor, an axis member rotatable with the rotor, a brake drum, and a rotor starter including a gear mounted on said drum substantially peripherally of the disk portion of the drum.

16. In an aircraft having a sustaining rotor; a rotor mount including a plurality of supporting post elements and an apex structure; relatively rotatable rotor axis parts, having a bearing therebetween, mounted on said structure; conduit means for discharging lubricant overflow from said bearing downwardly along a post element; a rotor brake mounted in association with said structure and having an operating connection extended downwardly to the body of the craft adjacent a post element; and a rotor starter having an operating part extended along a post element between the rotor axis and the body of the craft.

17. In an aircraft having a sustaining rotor mounted for normal rotation in one direction on an upwardly extended axis, a rotor brake having a part movable with the rotor and a part not normally so movable, the second mentioned part being arranged to effect a braking action when moved, generally circumferentially of the rotor axis in a direction opposite to normal rotor rotation, and the second mentioned part also being arranged for automatic release under the influence of rotation of the first mentioned part with the rotor.

18. In an aircraft having a sustaining rotor, upwardly extended rotor axis mechanism, a rotor axis mounting structure having an axis-part receiving socket extended above a major portion of the structure, and a rotor brake and a rotor starter at least partially mounted in association with said structure and arranged to react at least in part in a horizontal plane passing through said socket.

19. In an aircraft, a sustaining rotor, means for mounting the rotor generally above the body of the craft including a rotor hub structure, a downwardly open brake drum associated with said structure and rotating with the rotor, cooperating brake means at least partially housed within said drum structure, a control connection for the brake extended downwardly therefrom to the body of the craft, spring means also housed within said drum structure and associated with said connection in such manner as to limit the force with which the brake may be applied by actuation of said connection, whereby danger of damage to the brake, to the sustaining rotor and to the mounting structure is obviated.

20. In an aircraft, a sustaining rotor, means for mounting the rotor generally above the body of the craft including a rotor hub structure, a braking mechanism associated with the rotor, an actuating connection for said mechanism, and spring means interposed in said connection in such manner as to limit the force with which the brake may be applied, whereby danger of damage to the brake, to the sustaining rotor and to the mounting structure is obviated.

JOSEPH S. PECKER.